United States Patent [19]

Parks

[11] 4,439,407

[45] Mar. 27, 1984

[54] METHOD FOR IMPROVING FILTERABILITY OF GYPSUM AND WET PROCESS PHOSPHORIC ACID

[75] Inventor: Kenneth L. Parks, Plant City, Fla.

[73] Assignee: Agrico Chemical Company, Tulsa, Okla.

[21] Appl. No.: 459,257

[22] Filed: Jan. 19, 1983

[51] Int. Cl.³ .................... C01B 25/16; C01F 1/00; C01F 11/46
[52] U.S. Cl. .................... 423/317; 423/320; 423/321 R; 423/166; 423/555
[58] Field of Search ............ 423/316, 317, 555, 166, 423/321 R, 320

[56] References Cited

U.S. PATENT DOCUMENTS

| 2,851,335 | 9/1958 | Heinerth | 423/555 |
| 4,048,289 | 9/1977 | Pierres | 423/317 |
| 4,277,454 | 7/1981 | Long et al. | 423/320 |
| 4,279,877 | 7/1981 | Hill et al. | 423/317 |

FOREIGN PATENT DOCUMENTS 53-129168 10/1978 Japan .................... 423/555

*Primary Examiner*—Gregory A. Heller
*Attorney, Agent, or Firm*—Richards, Harris & Medlock

[57] ABSTRACT

A process for the improved filterability of wet process phosphoric acid which comprises maintaining the ratio of ferric ion to ferrous ion in the wet process phosphoric acid above about 1.0 when the total iron concentration of the product wet process phosphoric acid is in the range of from about 0.5% Fe to about 0.9% Fe. The ratio of ferric ion to ferrous ion may be controlled by controlling the temperature in the final stage of a multistage calcining process, addition of iron in the form of a compound which yields ferric ion upon dissolution, the oxidation of the iron in the wet process phosphoric acid, or a combination of the above.

8 Claims, 1 Drawing Figure

METHOD FOR IMPROVING FILTERABILITY OF GYPSUM AND WET PROCESS PHOSPHORIC ACID

TECHNICAL FIELD

This invention relates to improving the filterability of digested phosphate rock ore in the wet process production of phosphoric acid. More particularly, this invention relates to controlling the amount of iron, as well as the ratio of ferric ion to ferrous ion in solution, the control of which permits adjustment of the filterability of wet process phosphoric acid. The ratio of ferric ion to ferrous ion can be controlled or adjusted in several ways, such as, by adjustment of the calcining temperature of the final stage in a multistage calcining process, adding a compound which yields ferric ion upon dissolution, oxidation of the ferrous ion in solution to ferric ion in solution, or combinations thereof.

BACKGROUND ART

Wet-process phosphoric acid is produced by the acidulation of phosphate rock. This acidulation is generally accomplished by the treatment of phosphate rock with an acid, such as sulfuric or nitric acid. The acidulation process produces a phosphoric acid-calcium sulfate slurry plus other salts which require solids-liquids separation by filtration. The general equation for the process when sulfuric acid is utilized is:

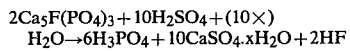

$$2Ca_5F(PO_4)_3 + 10H_2SO_4 + (10\times) H_2O \rightarrow 6H_3PO_4 + 10CaSO_4 \cdot xH_2O + 2HF$$

During the digestion of the ore with sulfuric acid, by-product calcium sulfate is formed. When the digestion takes place at about 80° C. or below and the solids-free phosphoric acid is below 30% $P_2O_5$ the by-product is calcium sulfate dihydrate or gypsum. This by-product is normally removed by filtration. Water can be evaporated from the resulting phosphoric acid product to increase the acid concentration. Typically, the digestion process produces a product prior to filtration that assays from 26% to 30% $P_2O_5$. The evaporation step, if utilized, increases the $P_2O_5$ concentration to 54% for merchant grade phosphoric acid or to above 70% for super phosphoric acid.

Normally, the production rate of the entire plant is dependent upon the filtration rate because in the past it has been the variable least subject to control. Impurities contained in the ore can markedly affect the filtration rate, as well as other operations of the process. Organic impurities adversely affect the wet process phosphoric acid manufacture for various reasons, which include the formation of stable froths in the digestor which impede the acidulation process. The organic impurities may also affect the size and shape of crystals of calcium sulfate which are formed and thus affect filtration rates, and the organic impurities may also lead to organic residues which coat the gypsum during filtration and thereby substantially reduce the filtration rate.

In order to remove organic impurities, phosphate rock has been calcined. While calcining of phosphate rock reduces the organic impurities, it may adversely affect the rock's reaction rate during the acidulation process by decreasing the reactivity or rate of reaction of the ore.

Impurities in phosphate rock can also be the source of corrosion. Excessive corrosion of plant equipment is undesirable in view of operating, fabrication, and maintenance costs. In copending application Ser. No. 338868, filed Jan. 11, 1982 and entitled "Multiple Stage Thermal Benficiation Process for Phosphate Ores" a multiple stage calcination process is disclosed which reduces not only the organic content but also the corrosive character of calcined ores. U.S. Pat. No. 4,277,454 discloses a method for controlling excessive corrosion in phosphoric acid circuits by oxidation of reduced ionic species in the acid within the digestion circuit to an EMF value above about 190 millivolts. While control of oxidation potential has been directed towards the prevention of corrosion, no effect on the filtration rate has been reported. In studying the effect of multiple stage calcination on the oxidation state of product phosphoric acid, an improvement in filtration rates have been observed for the more highly oxidized acids.

The present invention provides a method to increase the separation rate or filterability of the wet process phosphoric acid and by-product gypsum or calcium sulfate dihydrate. In the wet process, the degree of hydration of the calcium sulfate formed during the reaction or in any subsequent process steps is mainly controlled by the temperature, $P_2O_5$ concentration, and the level of dissolved impurities. When the process is carried out at or below 80° C. (176° F.) and the solids free phosphoric acid is below 30% $P_2O_5$, the degree of hydration of calcium sulfate is mainly as the dihydrate or gypsum.

A major factor in monitoring the economic and technical success of the process is the ease with which phosphoric acid can be separated from the by-product gypsum. Any procedure that enhances the rate of liquid-solid separation (usually filtration) has potential monetary value in that it permits increased production without new or significant capital investment. The present invention provides a method for increasing the filterability of wet process phosphoric acid by control of the total iron ion concentration in the acid and the ratio of ferric ion to ferrous ion in the acid. This can be achieved by adding a source of ferric ion, or oxidizing the iron naturally occurring in the ore, during digestion of the phosphate rock or by controlling the calcining temperature in the final stage of a multistage calciner or a combination of these.

BRIEF DESCRIPTION OF THE DRAWINGS

The accompanying drawings illustrate the invention. In such drawings.

SUMMARY OF THE INVENTION

Figure 1:
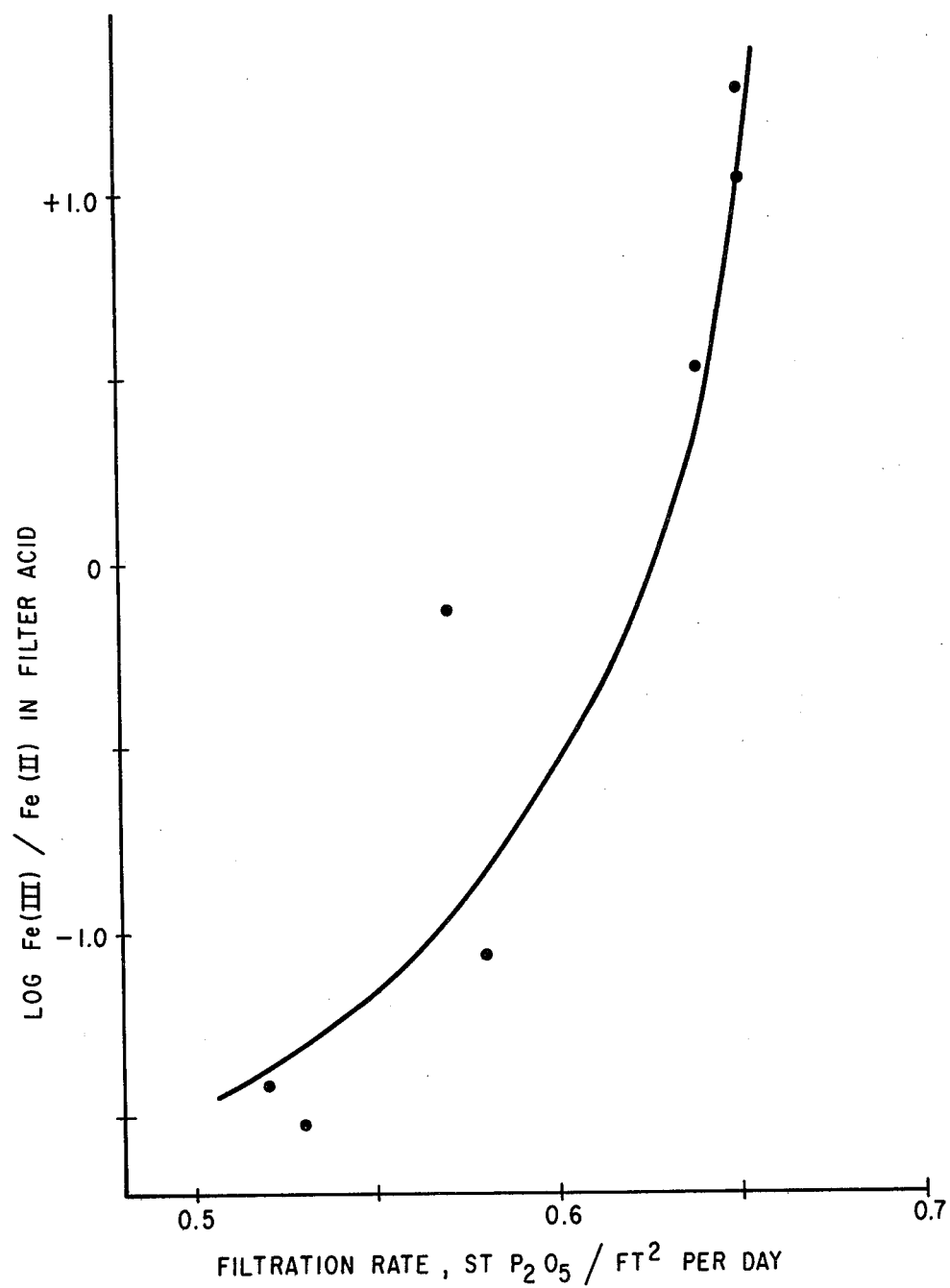
FIG. 1 is a plot of the observed filtration rates versus the base 10 logarithm of the corresponding wet process phosphoric acid's ferric ion to ferrous ion ratio.

The present invention permits the control of the filterability of wet process phosphoric acid by control of the level of ferric ion in the acid as well as the ratio of ferric ion to ferrous ion present in the wet process acid. Generally, iron levels in the product acid range from about 0.5% to 0.9% as iron (0.7% to 1.3% as $Fe_2O_3$) and the ratio of ferric ion to ferrous ion is maintained above 1.0. The total amount of iron may be provided by the naturally occurring iron content of the ore or by the addition of iron. The ratio of ferric ion to ferrous ion in the resulting phosphoric acid may be controlled by several methods such as control of the temperature of the final stage of a multistage calcining process, oxidation of the acid's naturally occurring iron or by addition to the acid of a compound which upon dissolution releases ferric ion, or elemental iron or a combination of the above.

In the preferred embodiment, the total iron content is preferably in the range of from about 0.5% to about 0.9% and the ratio of ferric ion to ferrous ion is maintained above 1.0. Most preferably, the total iron content is in the range of from about 0.5% to about 0.7%. It is not required that the total iron content be within the preferred ranges. Preferably the ratio of ferric ion to ferrous ion is controlled by the control of the final stage calcining temperature rather than by subsequent treatment during the acidulation process.

DETAILED DESCRIPTION

In accordance with the present invention, a method is provided for improving the filterability of wet process phosphoric acid by control of the ferric iron content and the ratio of ferric ion to ferrous ion. Where the ferric ion content of the ore is insufficient, ferric ion can be added to the system. Where the ore has a high iron content and it is undesirable to raise the ratio of ferric ion to ferrous ion by the addition of ferric ion, the ratio of ferric ion to ferrous iron can be adjusted by oxidation with agents such as $H_2O_2$, $O_2$, or $O_3$. In general, it is desirable to maintain a minimum ferric ion content permissible within the scope of the present invention because, in general, as the ferric ion increases the potential for forming undesirable sludge also increases. Iron in wet process phosphoric acid has been considered undesirable because it resulted in the precipitation of iron containing solids after the filtration and concentration steps have been completed and the formation of sludges during evaporation. However, for phosphate rock low in iron content the addition of ferric iron up to a total level of about 0.9% iron has been found to enhance filterability. As used herein, "% iron" or "%Fe" means iron content reported in equivalents to elemental iron; whereas in the trade the concentration of "iron" is generally expressed in the units of %$Fe_2O_3$. (The conversion factor being %$Fe_2O_3 \times 0.699 =$ %Fe.)

It has been discovered that the total ferric ion level in the wet process phosphoric acid as well as the ratio of ferric ion to ferrous ion in solution affects the filtration rate of the product. The more important factor of the two is ratio of ferric ion to ferrous ion in solution.

With a low iron content ore, one containing less than about 0.5% iron, it may be desirable in certain cases to increase the iron level to as much as about 0.8% to about 0.9% by the addition of ferric ion. A suitable method of adding iron in the ferric state is the addition of a compound which yields ferric ion upon dissolution. One such method is the addition of iron in the form of ferric sulfate ($Fe_2(SO_4)_3$) which can be economically produced by dissolving scrap iron in sulfuric acid and oxidizing the resultant ferrous sulfate ($FeSO_4$) solution with air, for example, to ferric sulfate. Those skilled in the art will appreciate that other methods are available and other compounds which yield ferric ion upon dissolution may be added.

Where addition to the total iron content is not desirable, the improved filterability can be obtained by oxidation of the iron naturally present in the acid. Oxidation is preformed in the digestion cycle by the oxidation of the wet process phosphoric acid slurry during gypsum formation. Ferric ion can be produced in situ by the oxidation of ferrous ion with an outside oxidation agent. This can be achieved by oxidizing the iron during the acidulation process with oxygen, manganese dioxide, hydrogen peroxide, or soluble chlorates, soluble nitrates, or soluble perchlorates. Preferably oxidation is achieved with either oxygen or hydrogen peroxide. Chlorates and perchlorates are the least desirable.

A third way of providing the desired ferric ion to ferrous ion ratio is by controlling the temperature in the final stage of a multi-stage calcining process. In copending application Ser. No. 338,868, now U.S. Pat. No. 4,389,380 a multi-stage thermal beneficiation process for phosphate ores is disclosed which is hereby incorporated by reference. This multistage process permits control of the calcining conditions so as to minimize the corrosive character of the resulting calcined ore. It has been discovered that control of the temperature in the final calcining stage affects the ratio of ferric ion to ferrous ion observed in the wet process phosphoric acid made from the referenced calcined ore thus allowing control of the filtration rate. One benefit of the multiple stage calcining process disclosed therein is that precise temperature control is possible. It has been discovered that this precise temperature control will also permit control of the ferric to ferrous ion ratio in the resulting calcined phosphate ore and subsequent phosphoric acid. Table 1 sets forth the ferric ion to ferrous ion ratio in phosphoric acid made from rock calcined at the various final stage temperatures for ores containing 0.5% Fe.

TABLE 1

| TEMPERATURE OF FINAL STAGE | |
|---|---|
| °F. | $Fe^{+3}$:$Fe^{+2}$ |
| 1279 | 2.1:1 |
| 1306 | 1.3:1 |
| 1314 | 0.78:1 |
| 1324 | 0.36:1 |

While it is possible to control the ferric/ferrous ion ratio in several manners, the ratio is preferably controlled by adjusting the temperature of the final stage of a multistage calcining process. This is preferable because no further reagents or capital investment is required. In the event that insufficient iron is present in the ore or that sufficient control of the ($Fe^{+3}$)/($Fe^{+2}$) ratio in the product cannot be obtained by the calcining temperature alone, then the ratio can be improved by the oxidation of the in situ iron or by the addition of ferric ion such as in the form of ferric sulfate.

EXAMPLES

The following examples are offered to illustrate the present invention and are not in any manner considered limiting.

The composition of phosphate ores varies from deposit to deposit and at times within each deposit. Eastern North Carolina ore which has been beneficiated to remove sand and then calcined according to the method described in co-pending application Ser. No. 338,868 has a typical analysis on a dry basis as follows:

| COMPONENT | WEIGHT PERCENT ON A DRY BASIS |
|---|---|
| $P_2O_5$ | 32.61 |
| total Fe | 0.55 |
| Organic (C) | 0.11 |
| Sulfide (S) | 0.11 |

Samples of this ore were acidulated and the filtration rates were determined by measuring the time required for a measured quantity of gypsum-phosphoric acid slurry to be separated on a 0.13 square foot industrial filter cloth (such as cloths sold by National Filter Media Corporation having a porosity of 250 cu. ft. of air/minute and 2×2 twill weave with 15 mil yarn). The slurry (one liter) was placed on the filter and liquid-solids separation was effected under a 500 mm Hg vacuum. Two countercurrent filter cake washes were performed, the first was a 1.06 specific gravity weak phosphoric acid wash and the second was a demineralized water wash. Both washes were 1 liter each. This procedure approximates industrial practice. Slurry typical of that used above was continuously produced by acidulation under the following conditions:

| Slurry temperature | 80° C. |
|---|---|
| Solids content of slurry | 35 wt. percent |
| P$_2$O$_5$ in filtrate | 29 wt. percent |
| H$_2$SO$_4$ in filtrate | 2.6 wt. percent |
| P$_2$O$_5$ recovery | 97.5% |
| Slurry retention time in the digestor | 5.5 hours |

Portions of the produced slurries were withdrawn and then tested for filtration rate at two hour intervals. The results of these filtration tests are set forth in Table II. The test duration indicates the number of hours that the aciduation process was carried out. The average filtration rate indicates an average of all filtration rates taken every two hours during the duration of the tests. In Example A and B, no iron was added to the system and the ferric/ferrous ratio was not adjusted in any manner. In Examples No. C and D, additional iron was added in the form of ferric sulfate in order to adjust the ratio of ferric ion to ferrous ion.

TABLE II

| Example No. | A | B | C | D |
|---|---|---|---|---|
| Test duration, hours | 102 | 97 | 77 | 24 |
| Fe$^{+3}$/Fe$^{+2}$ ratio in acid | 0.03:1 | 0.17:1 | 0.71:1 | 1.3:1 |
| Average filtration rate STP$_2$O$_5$/square ft. per day | 0.51 | 0.52 | 0.54 | 0.58 |
| Total Fe$^{+3}$ in acid (% Fe) | 0.01 | 0.14 | 0.31 | 0.41 |

The data of Table II can be fit to a line of the formula:

$$\text{filtration rate} = \alpha \times (Fe^{+3})^2 - 0.1\alpha(Fe^{+3}) + \alpha$$

where (Fe$^{+3}$) is the concentration of iron and "$\alpha$" is in the appropriate units to express the filtration rate in the desired units. This data demonstrates that the ratio of ferric ion to ferrous ion as well as the total quantity of ferric ion contributes to the filtration rate. The filtration rate may be determined by the method set out in copending application Ser. No. 338,868 now U.S. Pat. No. 4,389,380.

The following examples set forth in Table III demonstrate the effect of differences in the ferric/ferrous ion ratio on filtration rates. The acidulation tests were run continuously from 60 to 105 hours using calcined North Carolina phosphate rock produced under various calcining conditions. The ferric/ferrous ion ratios in the acids and their corresponding filtration behavior are set forth in Table III. In these examples, no iron was added other than that naturally occurring in the ore and incidental iron from the corrosion of equipment or abrasion of equipment during grinding. In contrast to the examples of Table II, the tests in Table III were run in the region of 28% P$_2$O$_5$ in the product acid.

TABLE III

| EXAMPLE | DURATION (HOURS) | % P$_2$O$_5$ IN ACID | SECOND STAGE CALCINING CONDITIONS | | | ST P$_2$O$_5$/Ft.$^2$ per day |
|---|---|---|---|---|---|---|
| | | | % O$_2$ (Excess) | TEMP. °F. | Fe$^{+3}$/Fe$^{+2}$ | |
| E | 105 | 28.0 | 16.5 | 1300 | 20 | 0.65 |
| F | 105 | 28.0 | 13.0 | 1297 | 11.5 | 0.65 |
| G | 60 | 28.0 | 18.5 | 1292 | 3.5 | 0.64 |
| H | 102 | 28.4 | 7.5 | 1298 | 0.03 | 0.53 |
| I | 100 | 27.7 | 10.5 | 1314 | 0.04 | 0.52 |
| J | 70 | 27.9 | 10.7 | 1278 | 0.78 | 0.57 |
| K | 70 | 27.7 | 14.2 | 1328 | 0.09 | 0.58 |

The data of Table III demonstrates that no further filtration improvement is obtained when the ratio of ferric to ferrous ion is above about 4:1.

The ratio of ferric ion to ferrous ion was determined by first determining the total iron by atomic absorption and then determining the ferrous ion by standard permanganate titration using Ferroin as an indicator. The ratio was then simply determined by subtracting the ferrous ion concentration from the total iron concentration and dividing that result by the ferrous ion concentration. Such a method is also suitable as a plant control analysis for North Carolina phosphate ores because these deposits are very uniform in composition with respect to iron content.

The total iron content of the acid may go above 0.9% but it is preferably kept below 0.9% and is most preferably kept in the range of from 0.5% to 0.7%.

The ratio of ferric ion to ferrous ion is preferably maintained above 1.0.

While the present invention has been described with respect to the preferred embodiments thereof, various modifications and adaptations will be apparent to one of ordinary skill in the art. Therefore, the above description of the preferred embodiment is not to be understood in a limited sense and this invention is circumscribed only by the scope of the appended claims.

What is claimed is:

1. A method to increase the filterability of wet process phosphoric acid comprising the steps of:
   (a) analyzing said wet process phosphoric acid to determine the total iron concentration and the relative concentrations of ferric ions and ferrous ions;
   (b) adding iron to said wet process phosphoric acid as necessary to maintain the total iron content in the range of from about 0.5% to about 0.9% expressed as % Fe; and
   (c) adjusting the ratio of said ferric ions to said ferrous ions above about 1.0.

2. The process of claim 1 wherein said total iron content is maintained in the range of from about 0.5% Fe to about 0.7% Fe.

3. The process of claim 1 wherein said ratio of ferric ions to ferrous ions is adjusted to a value between 1.0 and 4.0.

4. The process of claim 1, 2 or 3, wherein said added iron is in the form of a compound which yields ferric ion upon dissolution.

5. The process of claim 4 wherein said compound includes ferric sulfate.

6. The process of claim 1, 2 or 3, wherein said ratio of ferric ions to ferrous ions is adjusted by variation of the temperature in the final stage of a multi-stage calcining process.

7. The process of claim 1, 2 or 3, wherein the ratio of ferric ions to ferrous ions is adjusted by adding an oxidizing agent to said wet process phosphoric acid.

8. The process of claim 7 wherein said oxidizing agent is selected from the group consisting of $H_2O_2$, manganese dioxide, soluble chlorates, soluble nitrates and perchlorates.

* * * * *